United States Patent
Al-Salqan

[11] Patent Number: 6,160,891
[45] Date of Patent: Dec. 12, 2000

[54] METHODS AND APPARATUS FOR RECOVERING KEYS

[75] Inventor: Yahya Y Al-Salqan, Mountain View, Calif.

[73] Assignee: Sun Microsystems, Inc., Palo Alto, Calif.

[21] Appl. No.: 08/954,170

[22] Filed: Oct. 20, 1997

[51] Int. Cl.⁷ ....................................................... H04L 9/08
[52] U.S. Cl. ........................... 380/286; 713/165; 380/277
[58] Field of Search .................................. 380/21, 25, 30, 380/4, 281, 282, 286, 278, 44, 277, 279; 713/184, 165

[56] References Cited

U.S. PATENT DOCUMENTS

| | | | |
|---|---|---|---|
| 5,237,610 | 8/1993 | Gammie et al. | 380/10 |
| 5,481,613 | 1/1996 | Ford et al. | 380/30 |
| 5,757,913 | 5/1998 | Bellare et al. | 380/23 |

Primary Examiner—Gail O. Hayes
Assistant Examiner—Ho Sulc Song
Attorney, Agent, or Firm—Beyer Weaver & Thomas, LLP

[57] ABSTRACT

A key such as a private key or key password of a private key is encrypted for storage, and may be decrypted if the private key becomes lost or unavailable. The key is encrypted by encoding, for example, by hashing, private information such as mother's maiden name and social security number, and the result is used as a key to encrypt the private key using DES or another symmetric encryption technique. The encrypted key is again encrypted, for example using asymmetric encryption, using the public key of a trusted party such as the certificate authority that generated the private key. The result may be stored as a key recovery file by the principal of the private key or another party. To decrypt the key recovery file, the private key corresponding to the public key used to encrypt the key recovery file is used to decrypt the key recovery file, for example by asymmetric decryption. The result is symmetrically decrypted using a key obtained by encoding, for example, by hashing, the private information in the same manner as was used to encrypt the key. The result of this decryption is the key.

34 Claims, 5 Drawing Sheets

METHODS AND APPARATUS FOR RECOVERING KEYS

RELATED APPLICATIONS

The subject matter of this application is related to the subject matter of application Ser. No. 08/885,018 entitled, "Method and Apparatus for Recovering Encryption Session keys" filed on Jun. 30, 1997 by Yahya Y. Al-Salqan, and to application Ser. No. 08/955,015 entitled, "Method and Apparatus for Encoding Keys" filed concurrently with this application by Yahya Y. Al-Salqan, each application having the same assignee as this application and incorporated herein by reference in its entirety.

FIELD OF THE INVENTION

The present invention is related to cryptography and more specifically to the recovery of cryptographic keys.

BACKGROUND OF THE INVENTION

Encryption may be used to maintain the security of information. Information such as a message transmitted between a sender and a receiver may be encrypted to ensure that third parties do not have access to it. A computer file stored on a computer may also be encrypted to ensure that parties without authorization cannot obtain the information contained in the file, even if they have access to or possess the physical media on which the file is stored.

Two types of conventional encryption methods are used to secure information from misappropriation. Symmetric encryption methods use a key to encrypt information and use the same key to decrypt information. A message transmitted from sender to recipient may be symmetrically encrypted as long as the sender and the recipient have agreed upon the key. The Data Encryption Standard (DES) is an example of a symmetric encryption algorithm, and is described in Schneier, *Applied Cryptography*, (2d. ed., John Wiley & Sons, 1996).

Another form of encryption is known as asymmetric encryption. Asymmetric encryption encrypts information using one key known as a "public key", and decrypts the information using a different key known as a "private key". The private key is mathematically related to the public key, but extremely difficult to determine even if public key is known. Asymmetric encryption allows a person to post his or her public key for anyone to use to encrypt information to be sent to the holder of the private key. Messages encrypted using the public key remain secure against anyone but the person or persons who hold the private key.

The pair of public and private keys are generated by a cryptographic module, and provided to an individual. The individual shares the public key with others he expects will send him or her encrypted messages known as cipher text, while maintaining the secrecy of his or her private key. In order to bind the public key and the identity of the individual owner of the public key and private key pair, referred to herein as the "principal", a trusted party known as a "certificate authority" issues a certificate which allows third parties to verify the identity of the principal.

Many users of encryption will select from symmetric and asymmetric encryption methods to suit their needs. For example, symmetric encryption may be used to encrypt and decrypt messages to be sent over unsecure communication facilities. However, if the symmetric encryption key (referred to as a "session key") must be sent over an unsecure facility, the key itself may be encrypted asymmetrically prior to transmission. The recipient decrypts the session key using his private key, and then uses the session key to decrypt the message. This technique allows the relatively more secure asymmetric encryption to be used to secure the session key, while the faster-to-use symmetric encryption is used to secure the message.

If a file is being secured, many users will use the most secure method available. Because asymmetric encryption can be more secure than symmetric encryption, many users will use asymmetric encryption to encrypt stored data they wish to secure.

To ensure security of the private key, only the principal has access to it. Because the private key may be a lengthy string of difficult-to-remember bytes or characters, the private key may be DES-encrypted using a key password, which can be easier for the principal to remember. The encrypted private key is then stored, for example by a decryption program, and is accessible only with the key password. To use the private key, the principal types the key password to the decryption program or other program which stores the encrypted private key. The key password is used to decrypt the private key, and the decrypted private key is used to decrypt the message, file or other information encrypted using the public key. In the event that the principal loses or forgets his private key or the key password, it is virtually impossible to decrypt messages encrypted using the recipient's public key. It is not uncommon for a principal to lose or forget his or her private key or private key password.

Another problem results if the principal works in an organization. If the principal is the only person who knows the private key, and the principal dies or leaves the employment of the company that owns the encrypted information, the company will not have access to the encrypted information.

To allow the recovery of a lost, forgotten or unavailable private key, some certificate authorities keep a copy of each private key in a vault or other form of key escrow. However, a breach of security would allow an intruder to steal the private key and decrypt any message sent to the principal. In addition, to ensure the highest levels of security, some principals may not wish to allow third parties such as certificate authorities to keep copies of their private key.

Therefore, there is a need for a method and system to encrypt a key or key password to allow the key or key password to be securely stored and to allow the encrypted key or key password to be recovered by the principal or his or her organization if the private key or key password is lost or otherwise unavailable to a person authorized to use it.

SUMMARY OF INVENTION

A system and method accepts for decryption a key recovery file, for example, one encrypted as described in copending application Ser. No. 08/955,015. The key recovery file may be decrypted, for example using the private key of the certificate authority whose public key was used to asymmetrically encrypt the key recovery file. Private information used to produce the key recovery file is received from the principal, another party who has been trusted with it, or from storage, and encoded, for example by hashing it, using the same encoding function as was used to produce the key recovery file. The encoded private information is used as a key to symmetrically decrypt the decrypted key recovery file and produce the private key or key password.

DETAILED DESCRIPTION OF A PREFERRED EMBODIMENT

Figure 1:
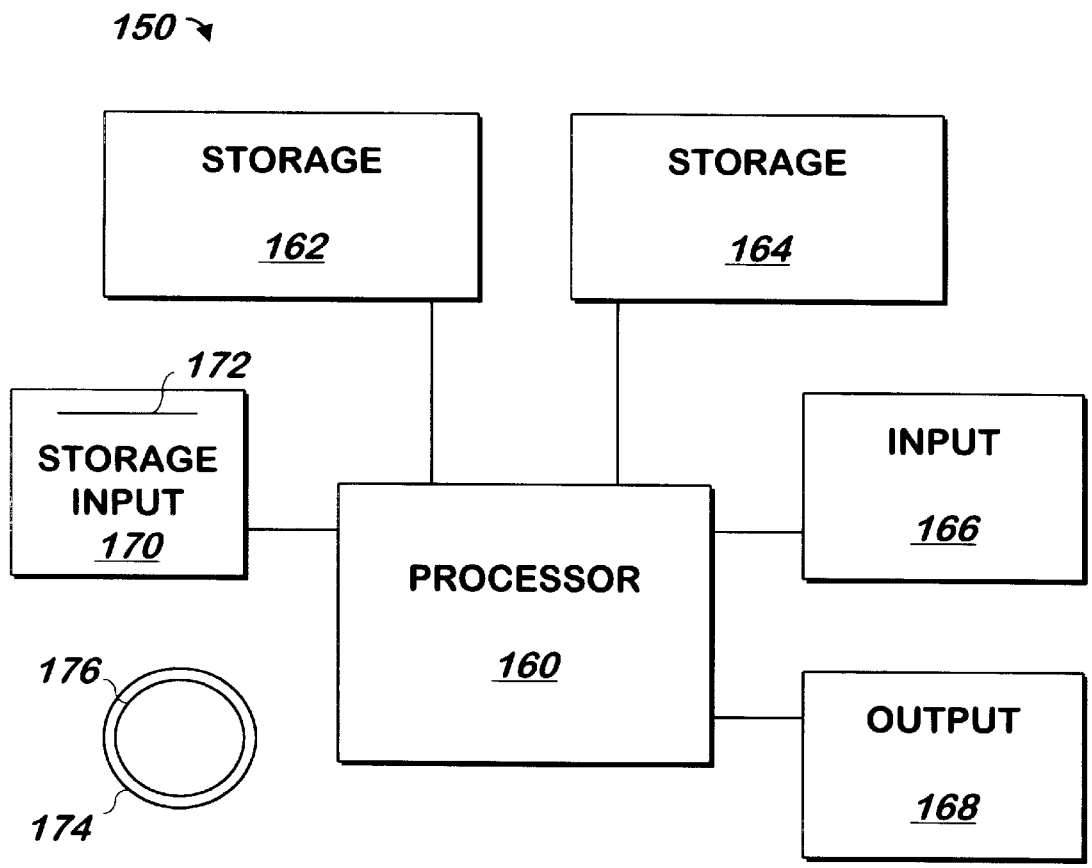
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive, CD-ROM drive or smart card interface accepts via input 172 computer program products 174 such as a conventional floppy disk, CD-ROM, smart card or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 1 Creator computer running the Solaris 2.5.1 operating system commercially available from Sun Microsystems of Palo Alto, Calif., although other systems may be used.

Figure 2:
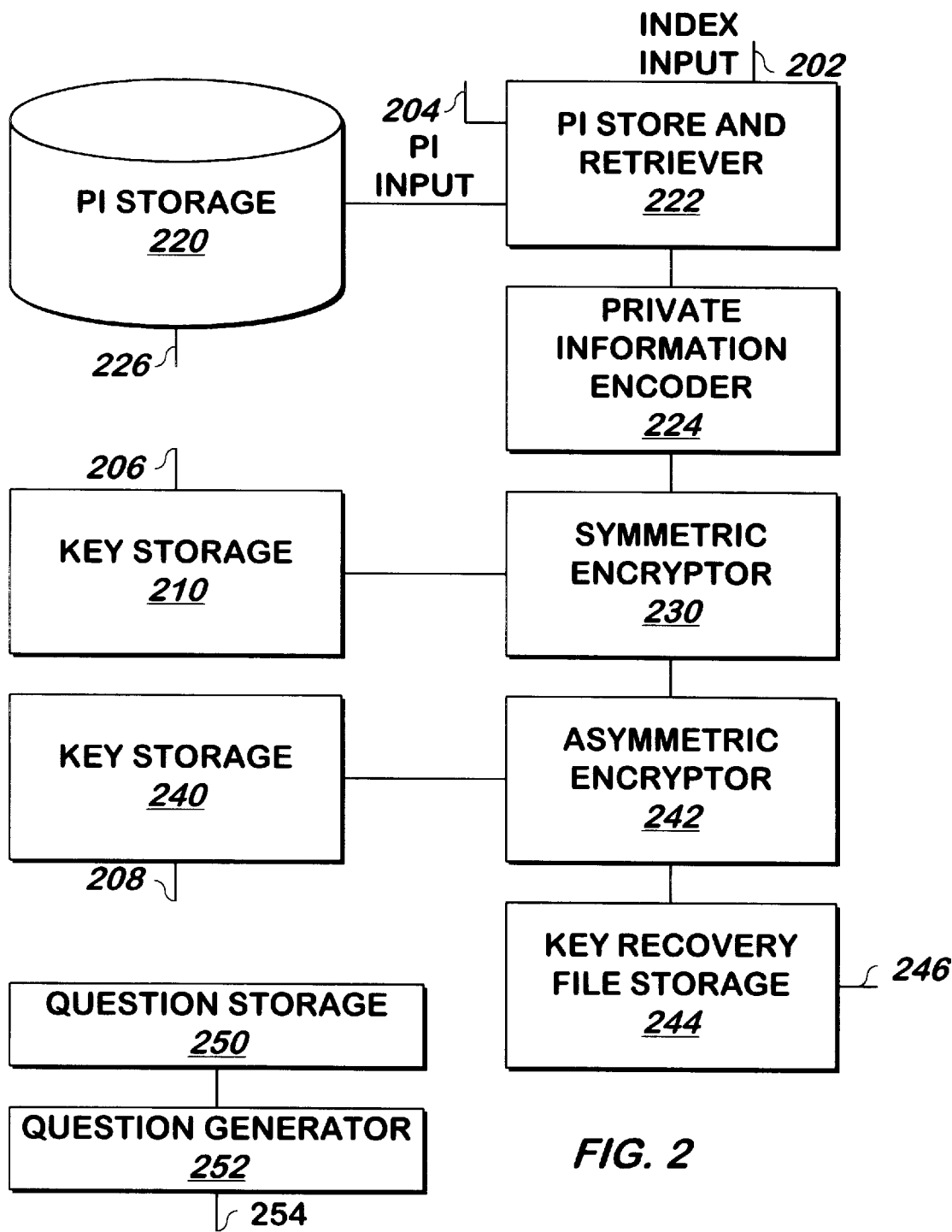
FIG. 2 is a block schematic diagram of a system for encrypting a key to produce a key recovery file according to one embodiment of the present invention.

Referring now to FIG. 2, a system for encrypting a key is shown according to one embodiment of the present invention. As used herein, a "key" can include a conventional session key or other key used for encryption and decryption of symmetrically encrypted information, a conventional private key used to decrypt asymmetrically encrypted information, a key password of a conventional key or private key, or any other information that is concealed from the public and used in any manner to decrypt an encrypted message or used to obtain such a key. In one embodiment, the key encrypted by the present invention is a key, although other information may be encrypted according to the present invention. The key to be encrypted is received at input 206 and stored in key storage 210. A key to be used to secure the key received at input 206, such as the public key of the certificate authority that issued the key received at input 206 is received at input 208 and stored in key storage 240. Private information storer and retriever 222 receives at input 204 private information. Private information is information that would likely be known only by the principal of the key received at input 206, such as social security number, mother's maiden name, and other similar information.

The principal or other party providing the private information may be prompted for the private information. Questions which prompt the private information may be retrieved from question storage 250 and provided by question generator 252 at output 254 coupled to a computer terminal or other device so that the questions may be provided to the principal, or other person attempting to recover the key from the key recovery file.

In one embodiment, the present invention stores the private information received for use as described below. Private information storer and retriever 222 receives at index input 202 an index used to store the private information received at input 204. In one embodiment, the index received at index input 202 is the public key of the individual providing the private information received at input 204. Private information storer and retriever 222 stores the private information in the private information storage 220 indexed by the index received at the index input 202. Private information storage 220 can provide the information indexed at output 226, for use as described below.

Private information storer and retriever 222 passes the private information received at private information input 204 to private information encoder 224. Private information encoder 224 encodes the private information it receives using any encoding function. In one embodiment, private information encoder 224 is a hasher, which hashes the private information it receives using a hash function. In one embodiment, the hasher is an SHA-1 hasher, which hashes the private information received using the conventional Secure Hash Algorithm, also referred to as the SHA-1 hash algorithm. In another embodiment, the hasher is an MD-5 hasher, which hashes the private information received using the conventional Message Digest 5 (MD-5) hash algorithm. The conventional Secure Hash Algorithm and MD-5 Algorithm are described in Schneier, *Applied Cryptography*, (2d. ed., John Wiley & Sons, 1996). Private information encoder 224 passes the result of the encoding to symmetric encryptor 230.

Symmetric encryptor 230 receives the encoded private information from private information encoder 224 and the key from key storage 210 and encrypts the key using a symmetric encryption function, with the result of the encoding function used as the encryption key to the symmetric encryption. In one embodiment, symmetric encryptor 230 is a conventional DES encryptor, which uses the conventional DES encryption or conventional triple DES encryption as the symmetric encryption function. The conventional DES encryption function and the conventional triple DES encryption function are each referred to herein as "DES encryption" or "DES Encrypting" and are described in Schneier, *Applied Cryptography*, (2d. ed., John Wiley & Sons, 1996). Symmetric encryptor 230 passes the encrypted key to asymmetric encryptor 242.

Asymmetric encryptor 242 encrypts the encrypted key received from symmetric encryptor 230 using an encryption method such as asymmetric encryption and the key received from and stored in key storage 240. Asymmetric encryption is described in Schneier, *Applied Cryptography*, (2d. ed., John Wiley & Sons, 1996). Asymmetric encryptor 242 passes the resulting encrypted key, referred to as a key recovery file, to key recovery file storage 244. Key recovery file storage provides at output 246 the key recovery file, which may be stored by the principal or others to retrieve the key encrypted therein. The key recovery file may then be deleted from key recovery file storage 244 so that only the principal or others authorized by the principal or other person receiving the key recovery file has the key recovery file.

In one embodiment, a user may not only assign a key password to a private key, but also occasionally update a key password. In one embodiment, a new key recovery file is produced as described herein using the present invention when the key password is assigned or updated.

Figure 3:
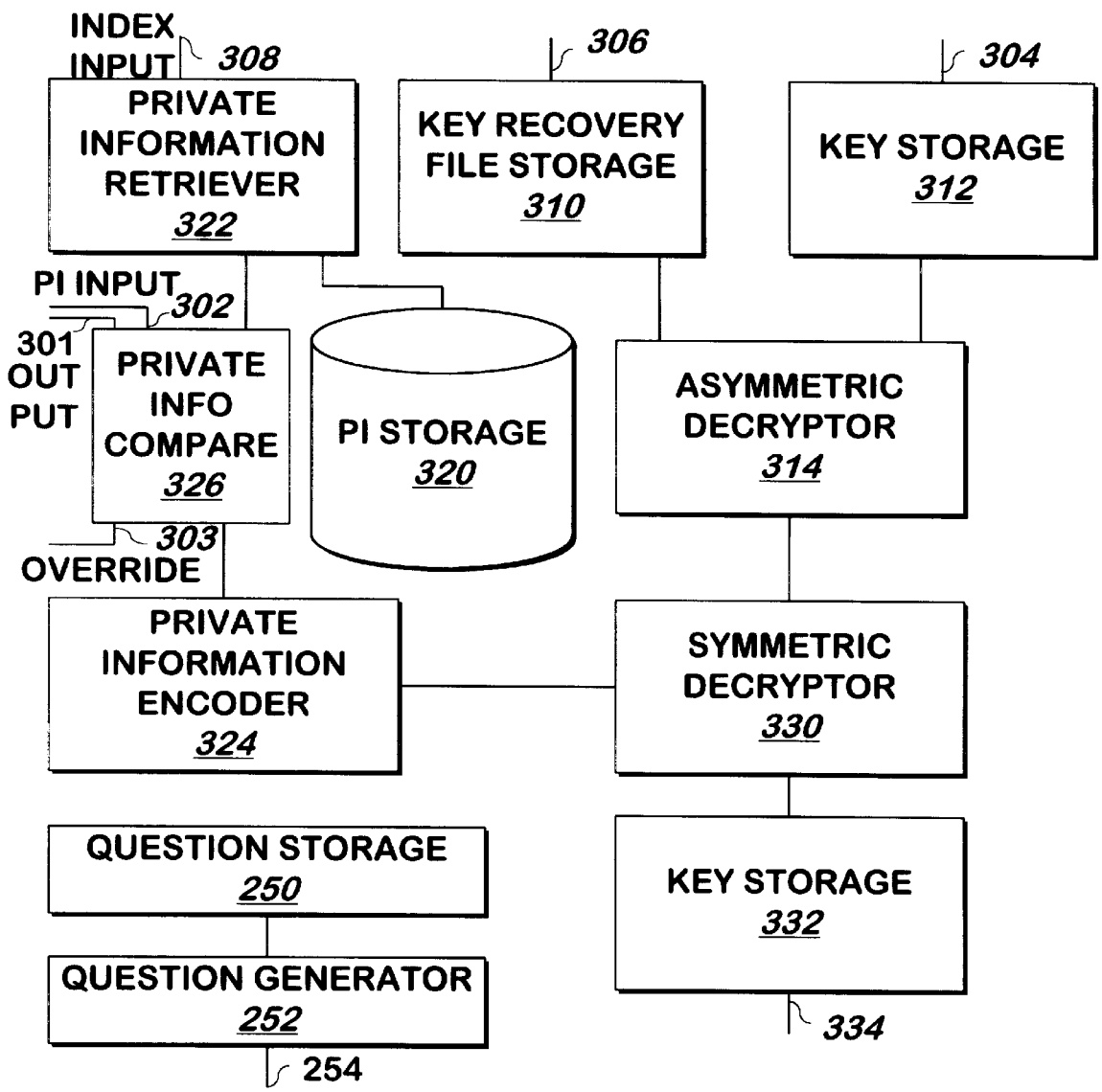
FIG. 3 is a block schematic diagram of a system for decrypting a key recovery file to produce a key according to one embodiment of the present invention.

Referring now to FIG. 3, a system for decrypting a key recovery file to produce a key is shown according to one embodiment of the present invention. The key recovery file is received at input 306 and stored in key recovery file storage 310. A key that will decrypt the encryption performed by the asymmetric encryptor 242 of FIG. 2 is supplied at input 304 and stored in key storage 312. If the key used to encrypt the key recovery file was the certificate authority's public key, the key received at input 304 is the certificate authority's private key.

Asymmetric decryptor 314 receives the key recovery file from key recovery file storage 310 and receives the certificate authority's private key from key storage 312. Asymmetric decryptor 314 decrypts the key recovery file using the certificate authority's private key stored in key storage 312 as the key. In one embodiment, the decryption asymmetric decryptor performs is conventional asymmetric decryption. Conventional asymmetric decryption is described in Schneier, *Applied Cryptography*, (2d. ed., John Wiley & Sons, 1996). Asymmetric decryptor 314 passes the decrypted key recovery file to symmetric decryptor 330.

In one embodiment, the principal may be prompted for the private information. Questions which prompt the private information may be retrieved from question storage 250 and provided by question generator 252 at output 254 coupled to a computer terminal or other device so that the questions may be provided to the principal, or other person attempting to recover the key from the key recovery file. Private information corresponding to these questions is received at input 302 by private information compare 326.

In one embodiment, the private information stored in private information storage 320 may be retrieved. In one embodiment, private information is, or contains information copied from or similar to, private information storage 220 of FIG. 2. In such embodiment, private information storage 320 is managed by a trusted party, such as the certificate authority. An index, such as the principal's public key, is received at input 308 and used by private information retriever 322 as an index into private information storage 320. Private information retriever 322 retrieves the private information stored in private information storage 320 and provides the private information to private information compare 326.

Private information compare 326 compares the private information received at input 302 with the private information received from private information retriever 322. If the private information received at input 302 matches or nearly matches the private information received from private information retriever 322, private information compare 326 passes the private information received at input 302 or the private information received from private information retriever 322 to private information encoder 324. If no such match is made, in one embodiment, private information compare 326 does not pass any private information to private information encoder 324, and in another embodiment, private information compare 326 passes the private information received at input 302 to private information encoder 324.

The private information may not be available from the principal, for example if the principal leaves the employment of an organization that continues to receive messages encrypted using the former employee's public key, or the organization wishes to decode information stored by the former employee and encrypted using a key known to the former employee and encrypted in a key recovery file as described above. In such embodiment, the user of the system shown in FIG. 3 can verify the identity of the person requesting the recovery of the key and signal via input 303, coupled to a conventional input device, such as a keyboard or mouse, that the comparison performed by private information compare 326 is to be overridden. Private information compare 326 then passes the private information received from private information retriever 322 to private information encoder 324.

In one embodiment, private information storage 320, private information retriever 322 and private information compare 326 are not used. Private information input 302 is coupled to the private information encoder 324, which encodes as described below whatever private information it receives via private information input 302.

Private information encoder 324 encodes the private information using the same procedure as private information encoder 224 of FIG. 2. In one embodiment private information encoder 324 encodes the private information into a fixed length result, for example using a hash function such as SHA-1 or MD-5 as described above. Private information encoder 324 provides the encoded private information to symmetric decryptor 330.

Symmetric decryptor 330 decrypts the key recovery file decrypted by symmetric decryptor 314 using the encoded private information received from private information encoder 324 as the decryption key. In one embodiment, symmetric decryptor employs a conventional symmetric decryption algorithm, such as the conventional DES algorithm or conventional triple DES algorithm to perform the decryption. As used herein, "DES decrypting" means decrypting using conventional DES decryption or triple DES decryption. In one embodiment, the decryption algorithm used by symmetric decryptor 330 is the decryption algorithm that corresponds to the encryption algorithm employed by symmetric encryptor 230 of FIG. 2. Symmetric decryptor passes the result to key storage 332. This result is the private key. The private key is then provided at output 334.

Figure 4:
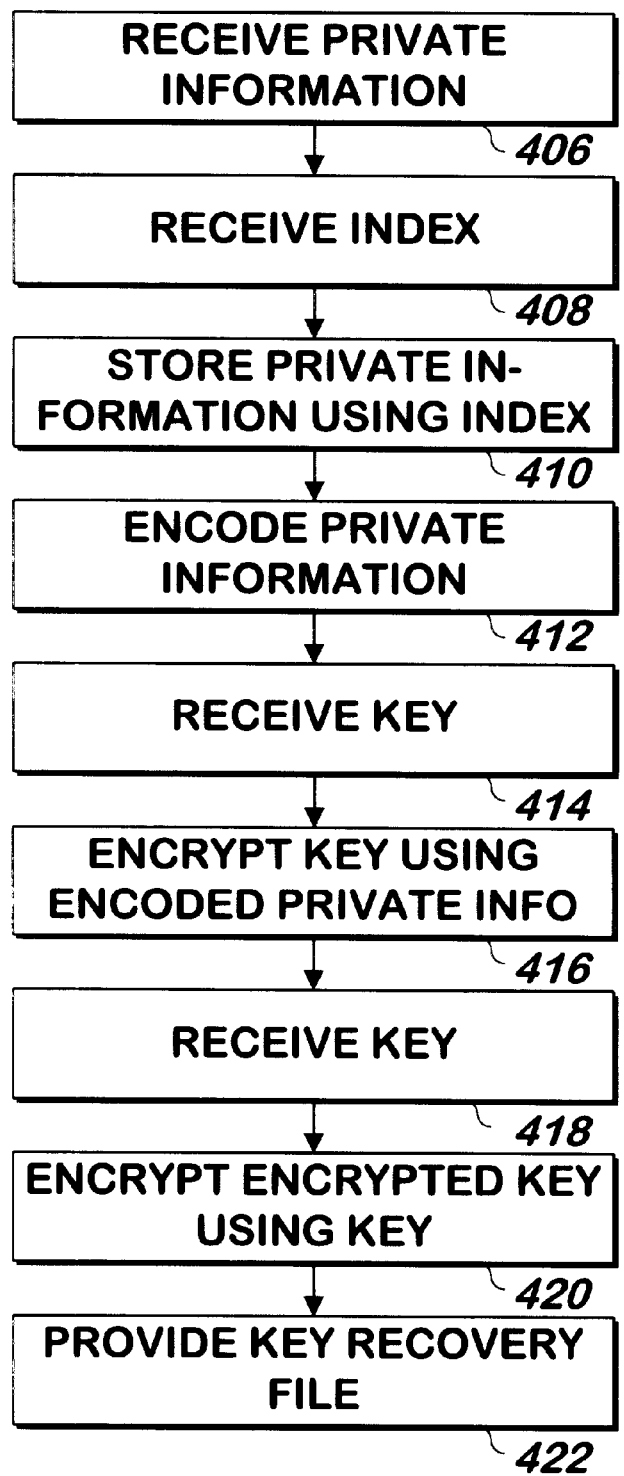
FIG. 4 is a flowchart illustrating a method of encrypting a key to produce a key recovery file according to one embodiment of the present invention.

Referring now to FIG. 4, a method of encrypting a key to produce a key recovery file is shown according to one embodiment of the present invention. Private information is received as described above 406. In one embodiment, an index is received 408, and the private information is stored 410 indexed by the index received. In one such embodiment, the index is the public key corresponding to the private key being encrypted.

The private information is encoded 412 as described above, for example using a hashing algorithm such as the secure hash algorithm SHA-1 or MD-5. The key to be encrypted is received 414. The key is encrypted 416, for example by using a symmetric encryption algorithm, such as DES encryption, with the private information encoded in step 412 as the encryption key.

A key, such as a public key of a trusted party such as the certificate authority that generated the key received in step 414 is received 418. The encrypted key produced in step 416 is encrypted 420, for example by using an asymmetric encryption function, with the key received in step 418 as the key to the encryption function. The result of step 420 is the key recovery file. The key recovery file is then provided 422 to the owner of the key or another party for safekeeping, and may be deleted by the party that produced the key recovery file.

Figure 5:
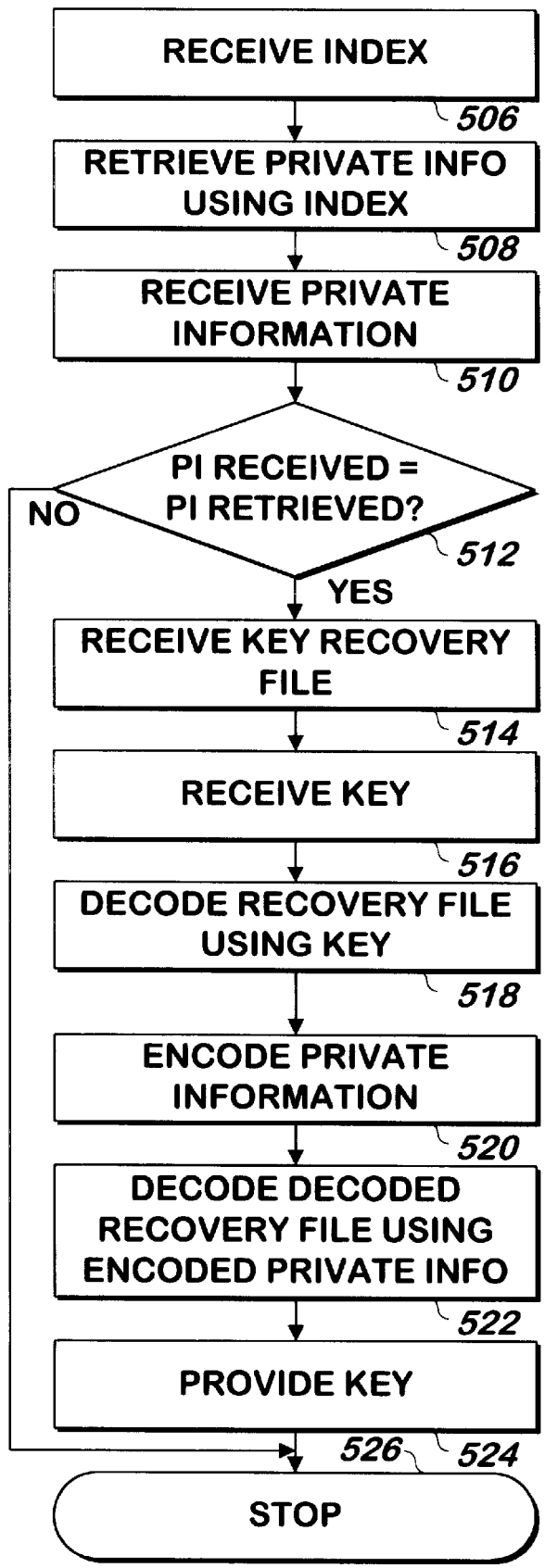
FIG. 5 is a flowchart illustrating a method of decrypting a key recovery file to produce a key according to one embodiment of the present invention.

Referring now to FIG. 5, a method of decrypting a key recovery file is shown according to one embodiment of the present invention. In one embodiment, the private information is stored as described above. An index may be used to retrieve the private information from storage. In such embodiment, the index is received 506 and the private information is retrieved 508 using the index received in step 508 as described above. In one embodiment, the index is the public key of the principal whose key is to be decrypted.

If the principal or other party is available to provide his or her private information, the private information is received 510, and compared 512 with the private information stored. If the private information received in step 510 is not equal to the private information retrieved from storage in step 508, the method terminates 526 in one embodiment.

If the principal is not available to provide his private information, steps 510 and 512 may be omitted, or replaced with other verification procedures to verify that the party requesting the recovery of the key recovery file is authorized to receive the key encoded in the key recovery file. Such verification may include receiving a sworn statement from an officer of a company, and comparing the name of the company with the name of the company listed on a certificate for the private key and public key pair. The key recovery file is also received 514.

A key corresponding to the key used to encode the key recovery file in step 420 of FIG. 4, such as a private key of the trusted party who provided their public key to encrypt the key recovery file, is also received 516. The key received in step 516 is used to decode 518 the key recovery file, such as by using conventional asymmetric decryption techniques. The private information received at step 512 is encoded 520, for example by hashing it using a hash function such as the SHA-1 or MD-5 hash function. The private information encoded at step 520 is used as a decryption key to symmetrically decode 522 the key recovery file decoded in step 518. The result is the key, which may be provided 524 to the party desiring the key.

What is claimed is:

1. A system for decrypting a key recovery file comprising an encrypted first key, the system comprising:
   a first decryptor, having a first input operatively coupled to receive at least a portion of the key recovery file and a second input operatively coupled to receive a second key, the first decryptor for decrypting at least a portion of the portion of the key recovery file received responsive to the second key received to produce a first decrypted first key and for providing at an output the first decrypted first key;
   a private information encoder having an input operatively coupled to receive a first set of private information, the private information encoder for encoding the first set of private information to produce encoded private information and for providing at an output the encoded private information; and
   a second decryptor having a first input coupled to the first decryptor output for receiving the first decrypted first key and a second input coupled to the private information encoder output for receiving the encoded private information, the second decryptor for decrypting the first decrypted first key received at the second decryptor first input responsive to the encoded private information received at the second decryptor second input to produce the first key and for providing the first key at an output coupled to a system output.

2. The system of claim 1 additionally comprising:
   a private information storage for storing a second set of private information, and for providing at an output coupled to the private information encoder input at least a portion of the second set of the private information stored responsive to a first index received at an input.

3. The system of claim 2, additionally comprising a private information compare having a first input coupled to the private information storage output for receiving the portion of the second set of private information and a second input operatively coupled to receive a third set of private information, the private information compare for comparing the portion of the second set of private information received at the private information compare first input and the third set of private information received at the private information compare second input and providing at an output coupled to the private information encoder input one selected from the portion of the second set of private information and the third set of private information responsive to the portion of the second set of private information received at the private information compare first input equivalent to the third set of private information received at the private information compare second input.

4. The system of claim 3 wherein the private information compare comprises an override input having a first state and a second state and the private information compare additionally provides at the private information compare output the portion of the second set of private information responsive to the override input in the first state.

5. The system of claim 2, wherein:
   the first key is one selected from a key password of a private key and a private key;
   the first index is a public key; and
   the private key is capable of use for decrypting information encrypted using the public key.

6. The system of claim 1 wherein:
   the private information encoder comprises a hasher having an input coupled to the private information encoder input to receive at least a portion of the private information, the hasher for hashing the private information received at the hasher input to produce hashed private information, and for providing the hashed private information at an output coupled to the private information encoder output; and
   the encoded private information comprises the hashed private information.

7. The system of claim 6, wherein the hasher comprises a SHA-1 hasher having an input coupled to the hasher input to receive at least a portion of the private information, the SHA-1 hasher for SHA-1-hashing the private information received at the SHA-1 hasher input to produce and provide at an output coupled to the hasher output the SHA-1-hashed private information; and
   the encoded private information comprises the SHA-1-hashed private information.

8. The system of claim 6, wherein the hasher comprises a MD-5 hasher having an input coupled to the hasher input to receive at least a portion of the private information, the MD-5 hasher for MD-5-hashing the private information received at the MD-5 hasher input to produce and provide at an output coupled to the hasher output the MD-5-hashed private information; and the encoded private information comprises the MD-5-hashed private information.

9. The system of claim 1 wherein:

the second decryptor comprises a DES decryptor having a first input coupled to the second decryptor first input for receiving the first decrypted first key, a second input coupled to the second decryptor second input for receiving the encoded private information, the DES decryptor for DES decrypting the first decrypted first key received at the DES decryptor second input responsive to the encoded private information received at the DES decryptor second input to produce a DES-decrypted first key, and for providing at an output coupled to the second decryptor output the DES-decrypted first key; and the first decrypted first key comprises the DES-decrypted first key.

10. The system of claim 1 wherein the second key is a private key.

11. The system of claim 10 wherein:

the first key is one selected from a key password of a private key generated by a certificate authority and a private key generated by a certificate authority; and the second key is a private key of the certificate authority.

12. The system of claim 1 wherein:

the first decryptor comprises an asymmetric decryptor having a first input coupled to the first decryptor first input to receive at least a portion of the key recovery file and a second input coupled to the first decryptor second input to receive the second key, the asymmetric decryptor for asymmetrically decrypting the key recovery file responsive to the second key to produce an asymmetrically decrypted key recovery file, and for providing at the output the asymmetrically decrypted key recovery file; and the first decrypted first key comprises the asymmetrically decrypted first key.

13. A method of decrypting a key recovery file comprising an encrypted first key, the method comprising:

receiving at least a portion of the key recovery file;

receiving a second key;

using a first decryptor, decrypting the portion of the key recovery file received responsive to the second key received;

receiving a first set of private information;

encoding the first set of private information received; and using a second decryptor, and responsive to the first set of private information encoded, decrypting the portion of the key recovery file.

14. The method of claim 13 wherein the receiving private information step comprises:

providing an index; and receiving the first set of private information responsive to the index provided.

15. The method of claim 14, wherein:

the receiving private information step additionally comprises receiving an index;

the index provided comprises at least a portion of the index received; and the index received comprises a public key.

16. The method of claim 14 additionally comprising the steps of:

receiving a second set of private information;

comparing the first set of private information received with the second set of private information received; and wherein the encoding step and the step of decrypting the key recovery file responsive to the first set of private information encoded are responsive to the first set of private information received being equivalent to the second set of private information received.

17. The method of claim 13 wherein the encoding step comprises hashing the first set of private information received using a hash function.

18. The method of claim 17 wherein the hash function is one selected from SHA-1 and MD-5.

19. The method of claim 13, wherein the decrypting step comprises DES decrypting the key recovery file decrypted using the encoded first set of private information as a decryption key.

20. The method of claim 13, wherein decrypting the key recovery file comprises asymmetrically decrypting the key recovery file using the second key received as a decryption key.

21. The method of claim 13, wherein the second key is a private key.

22. The method of claim 21 wherein:

the encrypted first key is produced from one selected from a key password of a first private key generated by a certificate authority and a first private key generated by a certificate authority; and the second key comprises a certificate authority private key.

23. The method of claim 13 wherein the first decryptor and the second decryptor are the same decryptor.

24. A computer program product comprising a computer useable medium having computer readable program code embodied therein for decrypting a key recovery file comprising an encrypted first key, the computer program product comprising:

computer readable program code devices configured to cause a computer to receive at least a portion of the key recovery file;

computer readable program code devices configured to cause a computer to receive a second key;

computer readable program code devices configured to cause a computer using a first decryptor to decrypt the portion of the key recovery file received responsive to the second key received;

computer readable program code devices configured to cause a computer to receive a first set of private information;

computer readable program code devices configured to cause a computer to encode the first set of private information received; and computer readable program code devices configured to cause a computer using a second decryptor to, responsive to the first set of private information encoded, decrypt the portion of the key recovery file.

25. The computer program product of claim 24 wherein the computer readable program code devices configured to cause a computer to receive private information comprise:

computer readable program code devices configured to cause a computer to provide an index; and computer readable program code devices configured to cause a computer to receive the first set of private information responsive to the index provided.

26. The computer program product of claim 25, wherein:
the computer readable program code devices configured to cause a computer to receive private information step additionally comprise computer readable program code devices configured to cause a computer to receive an index;
the index provided comprises at least a portion of the index received; and
the index received comprises a public key.

27. The computer program product of claim 26 additionally comprising:
computer readable program code devices configured to cause a computer to receive a second set of private information;
computer readable program code devices configured to cause a computer to compare the first set of private information received with the second set of private information received; and
wherein the computer readable program code devices configured to cause a computer to encode the first set of private information and decrypt the key recovery file responsive to the first set of private information encoded are responsive to the first set of private information received being equivalent to the second set of private information received.

28. The computer program product of claim 24 wherein the computer readable program code devices configured to cause a computer to encode comprise computer readable program code devices configured to cause a computer to hash the first set of private information received using a hash function.

29. The computer program product of claim 28 wherein the hash function one selected from is SHA-1 and MD-5.

30. The computer program product of claim 24, wherein the computer readable program code devices configured to cause a computer to decrypt comprise computer readable program code devices configured to cause a computer to DES decrypt the key recovery file decrypted using the encoder first set of private information encoded as a decryption key.

31. The computer program product of claim 24, wherein computer readable program code devices configured to cause a computer to decrypt the key recovery file comprise computer readable program code devices configured to cause a computer to asymmetrically decrypt the key recovery file using the second key received as a decryption key.

32. The computer program product of claim 24, wherein the second key is a private key.

33. The computer program product of claim 32 wherein:
the encrypted first key is produced from one selected from a key password of a first private key generated by a certificate authority and a first private key generated by a certificate authority; and
the second key comprises a certificate authority private key.

34. The computer program product of claim 24 wherein the first decryptor and the second decryptor are the same decryptor.

* * * * *